Feb. 8, 1938.  G. C. MALCOMSON  2,107,641
DISPLAY DEVICE
Filed March 2, 1935  2 Sheets-Sheet 1
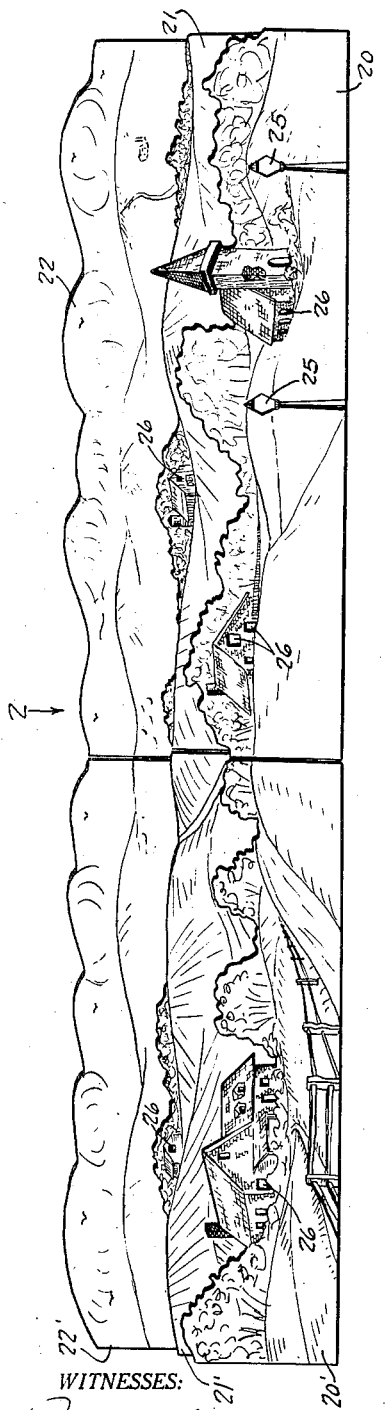
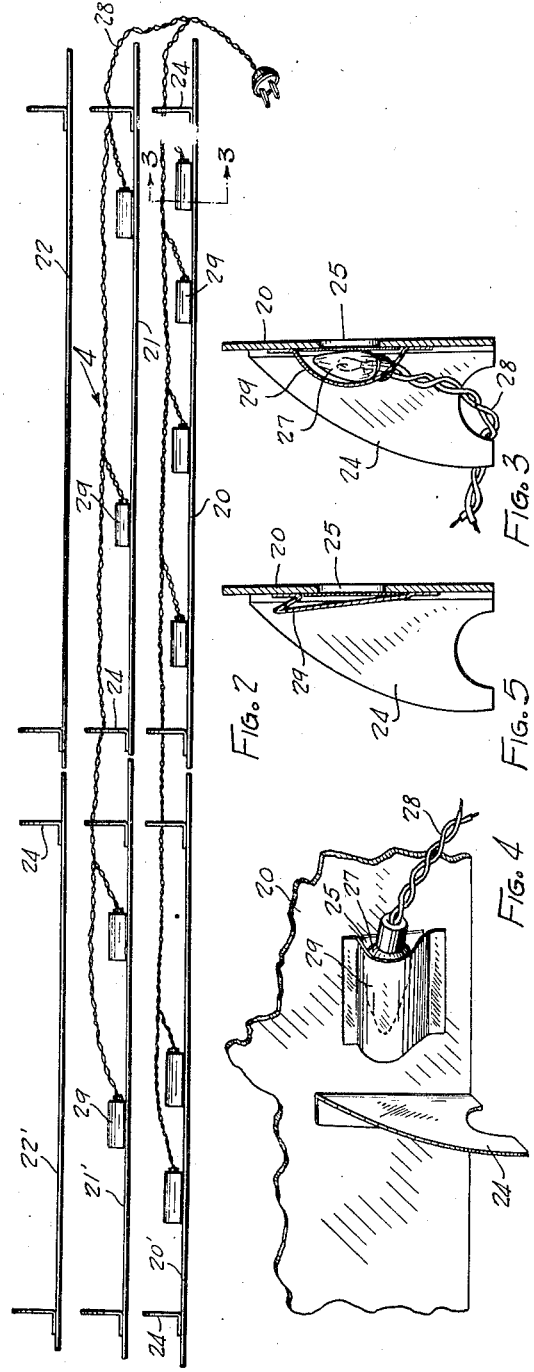
WITNESSES:
Jackson F. Normann
Anna M. Ward
INVENTOR:
GILBERT CUPPS MALCOMSON
BY Joshua E. H. Potts
ATTORNEY Feb. 8, 1938.  G. C. MALCOMSON  2,107,641
DISPLAY DEVICE
Filed March 2, 1935  2 Sheets-Sheet 2
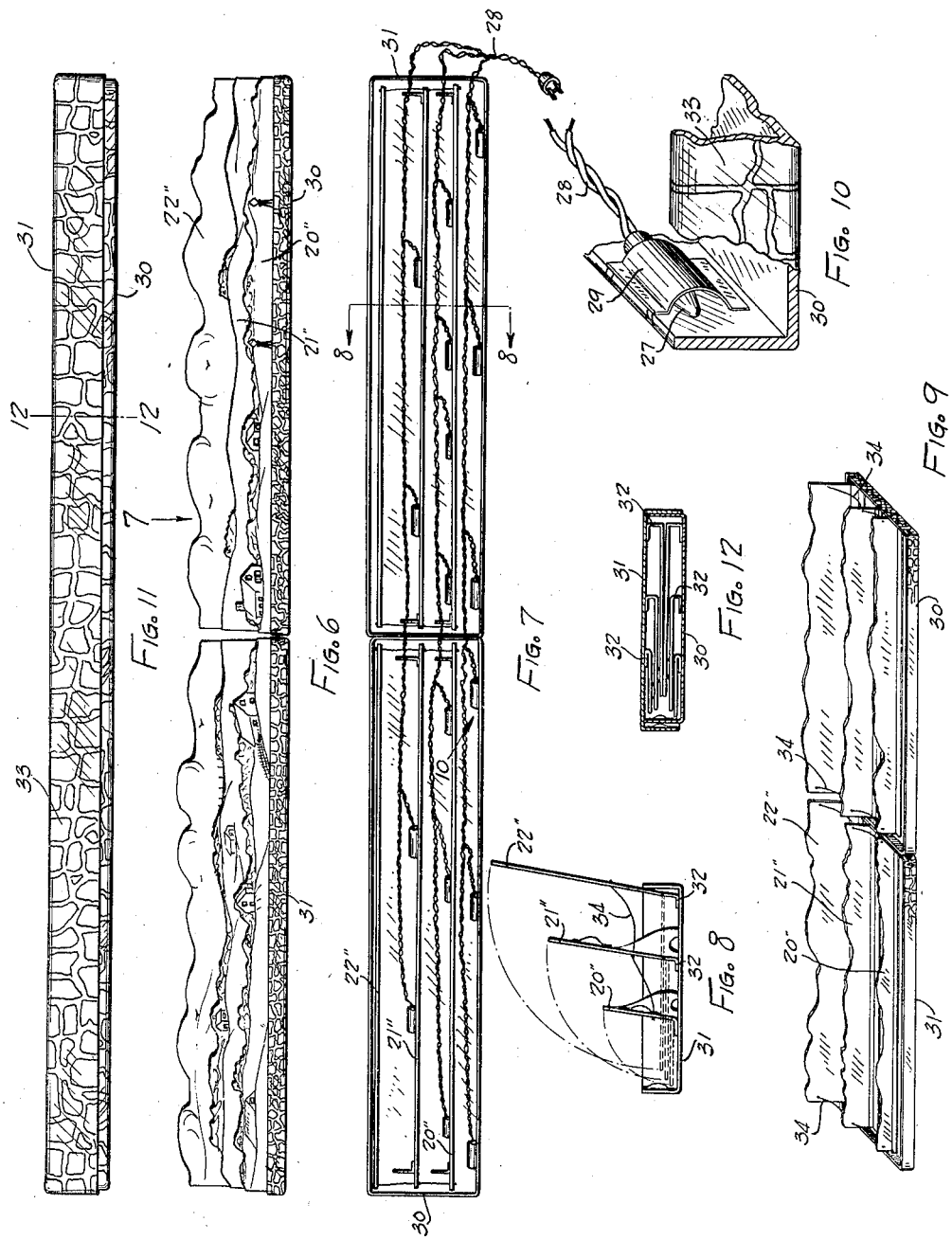
WITNESSES:
Jackson F. Normann
Anna M. Ward
INVENTOR:
GILBERT CUPPS MALCOMSON
BY Joshua R H Hotk
ATTORNEY Patented Feb. 8, 1938

2,107,641

UNITED STATES PATENT OFFICE 2,107,641

DISPLAY DEVICE

Gilbert Cupps Malcomson, Collingswood, N. J.

Application March 2, 1935, Serial No. 8,974

7 Claims. (Cl. 40—130)

This invention relates to display devices and has for an object to provide a device comprising a plurality of upright boards, or the like, with improved illuminating effects.

A further object of the invention is to provide, in a display device, a structure comprising a plurality of boards in stepped relation with illuminating means, in some instances, visible through the boards, and, in other instances, reflecting from one board to an adjacent board.

A further object of the invention is to provide a display device consisting of a plurality of boards, or the like, properly contoured and decorated to represent some scene, or the like, with improved illuminating system therefor.

A further object of the invention is to provide a display device comprising a plurality of stepped boards adapted to be stacked for storage or packing in small space.

A further object of the invention is to provide a display device which includes a packing box with a plurality of boards, or the like, hingedly attached within the box and lid adapted to be erected to upright spaced positions, with illuminating effects arranged to display said boards.

The invention, therefore, comprises, in its rudimentary form, a plurality of boards, or other plane devices, properly contoured and decorated for scenic inter-action, said boards being properly spaced to indicate perspective, the decoration and contour lending itself to illumination which is affected by light units associated with the spaced boards in such relation as, in some instances, to shine through openings in the boards coordinated with the scenic effects, and, in other instances, the same or other illuminating elements to reflect light upon the next succeeding board, illuminating the scenic effect of such board and also combining the mounting of said boards hingedly within a box and its lid, whereby the boards may be raised to upright position within the box and lid and be grouped for better and more expanded scenic effect, and in providing the box and lid with flanges decorated to add to the scenic effect produced by the upstanding boards so grouped.

The drawings illustrate several embodiments of the invention and the views therein are as follows:

Figure 1 is a view of the display device seen in elevation from the front.

Figure 2 is a top plan view as indicated by arrow 2 at Figure 1.

Figure 3 is a transverse sectional view on an enlarged scale taken on line 3—3 of Figure 2.

Figure 4 is an enlarged detailed perspective as indicated by arrow 4 at Figure 2.

Figure 5 is a transverse sectional view taken on the same plan as Figure 3, but with the light unit removed and the loop crushed.

Figure 6 is a view in front elevation of a different modification of the invention.

Figure 7 is a top plan view of the type shown at Figure 6 and as indicated by arrow 7 at Figure 6.

Figure 8 is a transverse sectional view taken on line 8—8 of Figure 7, but with the light units removed.

Figure 9 is a perspective view on a reduced scale of the embodiment shown at Figure 6.

Figure 10 is a perspective detailed fragmentary view as indicated by arrow 10 at Figure 7.

Figure 11 is a view in edge elevation of the box and lid of the type shown at Figures 6 to 10 inclusive.

Figure 12 is a transverse sectional view of the box closed taken on line 12—12 of Figure 11.

Like characters of reference indicate corresponding parts throughout the several views.

In its simplest form, the present invention comprises the boards 20, 21 and 22. While three of such boards are shown, it is to be understood that the number is wholly elective, and that more or less may be employed, and that three are shown only by way of illustration. These elements called boards will be understood as being any improved sheet material and that the term "board" is used to indicate any plane device irrespective of the material of which it is composed. The boards 20, 21 and 22 are provided with easel brackets 24 by which the boards may be maintained in upright position.

In setting up the boards, they will preferably be spaced apart as indicated more particularly at Figure 2 and for the scenic effect, the boards will be stepped, the front board, indicated hereunder as 20, being lower than the next board, indicated as 21, which, in turn, is lower than the next succeeding board, indicated as 22. This stepped relation will be maintained irrespective of the number of boards employed. Also, the boards will be provided with decorations indicating scenic effects and of such cooperative nature that the several boards, one in back of the other, will, by such decorative effects, indicate perspective. This will be brought out not only in the sizes of the individual parts shown but in making the rearmost decorated effects more indistinct, therefore indicating distance.

For further producing desirable effects, some or all of the boards will be provided with cutouts or perforations which may be covered with translucent material, uncolored or colored as may be desired. Such openings and their translucent covers are indicated by the representation of the lamp posts shown at 25 and windows 26 appearing in illustrations of buildings, or the like.

Back of these openings, illuminating elements, as the light bulbs 27, will be supported and connected through the wiring 28 with any source of electrical energy. The supports for these elements 27 are preferably loops 29 which are made of translucent material. In the cheaper embodiments of the device, these loops may be made of translucent paper which well illustrates the function, but in more expensive embodiments, other translucent sheet material may be employed, and all are fully within the scope of the invention.

The embodiments, as shown at Figures 1 to 5 inclusive, include the separate elements which are individually packed or stored as occasion may make necessary or desirable. The carrying forward of this invention includes the use of a box 30 and a lid 31. The several boards, indicated as 20'', 21'' and 22'', are, in this instance, hinged as shown at 32 within the box and lid, so that they may be folded, as shown at Figure 12, or erected, as shown at Figure 8, and still remain within the box and lid. When erected, the box and lid may be placed end to end, or otherwise grouped, as found desirable, and preferably the box and lid will be decorated so that when so grouped, the box and lid parts will enter into the scenic effect. As shown at Figures 6 to 12 inclusive, the box and lid, at least the flanges, are decorated to indicate a stone wall, as shown more particularly at 33 in Figure 10 and at Figure 11. This is merely by way of illustration as is also the scenic effect shown in any and all of the illustrations.

Threads, cords, or the like, indicated at 34, may connect the several boards so that by the manual erection of the rearmost board, shown as 22'', all of the other boards employed, represented by 20'' and 21'', will be erected through the several arcs shown at Figure 8 to the erect positions. In the particular type shown, light loops 29 are shown in the flanges of the box and cover so that the foremost board 20'' will be illuminated by a mellow light transmitted through the translucent loops 29, as well as carrying forward the illustration as shown at Figures 1 to 6 inclusive.

At the end of the display period, the illuminating effects may be discontinued by removal of the elements 27 from the supporting loops 29 of the device, and packaged either by placing one board on top of the other, in the type shown at Figures 1 to 5 inclusive, or folded down within the box and lid and the lid placed upon the box in the embodiment shown at Figures 6 to 12 inclusive.

Of course, the display device herein described may be modified and changed in various ways without departing from the invention here set forth and hereinafter claimed.

I claim:—

1. A display device comprising a plurality of boards disposed in spaced parallel planes and having openings therethrough, said boards carrying pictorial representations making up the display, said openings constituting a part of the pictorial representations, and illuminating means visible through said openings to impart reality to the pictorial representations, and also illuminating others of said boards.

2. A display device comprising a plurality of upstanding decorated boards disposed in laterally spaced planes, some of said boards having openings therethrough corresponding in position to the decorative effect, and illuminating elements illuminating said openings and others of said boards.

3. A display device comprising a plurality of upstanding decorated boards disposed in laterally spaced planes and having translucent parts in some of said boards corresponding with the decorative effect, translucent supporting members cooperating with said translucent parts, and illuminating elements carried by said supporting members showing illumination through said translucent parts and supports.

4. A display device comprising a plurality of boards disposed in spaced planes, some of said boards being provided with decorative effects, including translucent parts, collapsible translucent loops at the rear of the boards and covering said translucent parts, and illuminating elements within said translucent loops.

5. A display device comprising a decorated packaging unit, a plurality of boards hingedly connected within the unit to decorate in consonance with the decoration of the packaging unit, means to erect said boards to upright spaced positions, and means for supporting illuminating units interposed between the boards and between parts of the packaging unit of the adjacent board.

6. A display device comprising a box and lid similarly decorated with scenic effects, a plurality of boards hinged within the box and within the lid, means for erecting said boards in upright spaced relation, and decoration formed upon said boards corresponding with the decoration of the cover and box, and the decoration of the boards in the box and lid corresponding with each other.

7. A display device comprising a plurality of boards having openings therein, means for maintaining the boards in spaced relation in laterally spaced planes, said boards being provided with pictorial representations constituting the display, with the openings present as a part of the pictorial representations, and illuminating means visible through the openings in certain of the boards to impart reality to the pictorial representations, said illuminating means also providing illuminating effects on the other boards.

GILBERT CUPPS MALCOMSON.